United States Patent [19]
Kubota et al.

[11] 3,801,456
[45] Apr. 2, 1974

[54] METHOD FOR PRODUCING L-ARGININE BY FERMENTATION

[75] Inventors: Koji Kubota, Kanagawa; Takiko Onoda, Tokyo; Hirotaka Kamijo; Fumihiro Yoshinaga, both of Kanagawa; Shinji Okumura, Tokyo, all of Japan

[73] Assignee: Ajinomoto Co., Inc., Tokyo, Japan

[22] Filed: June 19, 1972

[21] Appl. No.: 264,316

[30] Foreign Application Priority Data
June 21, 1971 Japan.............................. 46-44620

[52] U.S. Cl............................................... 195/28 R
[51] Int. Cl............................................ C12d 13/06

[58] Field of Search............................. 195/28 R, 29

[56] References Cited
UNITED STATES PATENTS
3,222,258  12/1965  Iizuka et al. .................... 195/3 H X

*Primary Examiner*—Lionel M. Shapiro
*Assistant Examiner*—R. B. Penlend

[57] ABSTRACT

L-Arginine is produced by fermenting a culture medium containing n-alkanes as a carbon source by mutants of Brevibacterium and Arthrobacter capable of growing on a medium containing more than 200 µg/ml sulfaguanidine or 1,000 µg/ml 2-thiazolealanine.

3 Claims, No Drawings

METHOD FOR PRODUCING L-ARGININE BY FERMENTATION

This invention relates to a method for producing L-arginine (hereinafter referred to as arginine) by fermentation.

Arginine is an important amino acid widely used for medicine and feed, and has been prepared on a commercial scale from protein hydrolyzates at relatively high cost in a complex isolation procedure. It is produced by certain wild strains of Corynebacterium and Brevibacterium produce arginine from hydrocarbons in a very low concentration (U.S. Pat. Nos. 3,222,258 and 3,440,141).

It have now been found that certain mutant strains of microorganisms belonging to genus Brevibacterium or Arthrobacter and capable of assimilating n-alkanes produce significant amounts of arginine in an aqueous medium containing n-alkanes as the carbon source.

The mutant strains employed in the process of this invention can be readily derived by known mutation methods from parent strains of genera Brevibacterium and Arthrobacter capable of assimilating n-alkanes. The parent strains are incapable of producing extracellular arginine.

Usually, an effective arginine producing mutant strain is found to be resistant to a growth inhibiting agent for the parent strain, such as 2-thienylserine, D-serine, ethionine, 2-thiazolealanine, $\alpha$-amino-$\beta$-hydroxyvaleric acid, 6-chloropurine and sulfa drugs (sulfaguanidine, sulfamerazine, sulfisomezole, sulfisoxazole, etc.). Especially, a mutant strain capable of growing on a medium containing more than 200 ug/ml sulfaguanidine or more than 1,000 $\mu$g/ml 2-thiazolealanine is most effective. Sometimes the addition of characteristic nutrients required for growth of the resistant strain improves the yield of arginine.

The most effective arginine producing mutants found so far are Brevibacterium ketoglutamicum AJ-3351 (FERM-P 974) and Arthrobacter paraffineus AJ-3352 (FERM-P 975). The FERM-P -number is the deposit accession number of the Fermentation Research Institute, Agency of Industrial Science and Technology, the Ministry of International Trade and Industry, of No. 1-8-5, Inagehigashi, Chiba-shi, Chiba-ken, Japan.

The culture media used in the present invention are conventional in themselves, and contain n-alkanes as the assimilable carbon source, assimilable nitrogen sources, inorganic ions and, if necessary, minor organic nutrients. Assimilable nalkanes have nine to twenty carbons. The n-alkanes are added to aqueous media in an amount of 1 to 15 g/dl. Assimilable nitrogen sources include ammonium salts, nitrate salts, amino acids, urea and gaseous ammonia. For a good yield of arginine, the fermentation is carried out aerobically with aeration and agitation. Best yields require pH control within the range of 5 to 9. The desired pH may be maintained by means of gaseous or aqueous ammonia, calcium carbonate, alkalimetal hydroxide, urea, and organic or inorganic acids.

When the fermentation is carried out at 24°–37°C, the maximum concentration of arginine in the broth is reached within 2 to 7 days.

The arginine accumulated in the fermentation broth can be recovered by conventional methods, such as by using ion exchange resin in combination with precipitation. The arginine was identified by its ninhydrin reaction on a paper chromatogram, the Rf value on the paper chromatogram, a positive Sakaguchi reaction and growth curves of arginine requiring mutants of lactic acid bacteria. The arginine in the broth was determined by bioassay employing Leuconostoc mesentroides ATCC 8042.

Example 1

20 Ml batches of a medium containing 10 g/dl n-alkanes (a commercial product containing n-alkanes having twelve to eighteen carbon atoms), 2 g/dl $(NH_4)_2HPO_4$, 0.1 g/dl $KH_2PO_4$ 0.1 g/dl $K_2HPO_4$, 0.1 g/dl $MgSO_4 \cdot 7H_2O$, 1 mg/dl $FeSO_4 \cdot 7H_2O$, 1 mg/dl $MnSO_4 \cdot 4H_2O$, 30 $\mu$g/l biotin, 2 mg/l thiamine·HCl, 0.5 ml/dl soybean protein hydrolyzate, 0.1 ml/dl corn steep liquor and 2 g/dl $CaCO_3$, and of pH 7.0 were placed in 500 ml flasks, and were sterilized by heat. Brevibacterium ketoglutamicum AJ 3351 (FERM-P 974) previously cultured at 30°C for 24 hours on a medium containing 1 g/dl peptone, 1 g/dl yeast extract, 0.5 g/dl NaCl and 2 g/dl agar was transferred to the flask and cultured for 72 hours at 31°C with shaking. The cultured broth was found to contain 2.4 g/l L-arginine.

One liter of the cultured broth was centrifuged to remove cells. The supernatant was passed through a column packed with a cation exchange resin (Amberlite C-50 $NH_4^+$ -form), and arginine was eluted with 2N $NH_4OH$. The eluate was concentrated to precipitate crude crystalline arginine. 12 G of the crystalline material obtained.

Example 2

Arthrobacter paraffineus AJ 3352 was cultured by a method analogous to that of Example 1, and 1.5 g/l arginine was accumulated in the medium.

What is claimed is:

1. A method of producing L-arginine which comprises culturing an L-arginine-producing mutant strain of Brevibacterium or Arthrobacter and capable of assimilating n-alkanes, in an aqueous medium containing n-alkanes as the carbon source, an assimilable source of nitrogen, inorganic salts and minor organic nutrients necessary for the growth of said mutant strain, and recovering the accumulated L-arginine from the cultured broth, said mutant strain being Brevibacterium ketoglutamicum FERM-P 974 or Arthrobacter paraffineus FERM-P 975.

2. A method as set forth in claim 1, wherein said mutant strain is Brevibacterium ketoglutamicum FERM-P 974.

3. A method as set forth in claim 1, wherein said mutant strain is Arthrobacter paraffineus FERM-P 975.

* * * * *